July 26, 1932.  A. P. BRUSH  1,868,814
PURIFIER FOR LUBRICATING SYSTEMS
Filed June 24, 1929
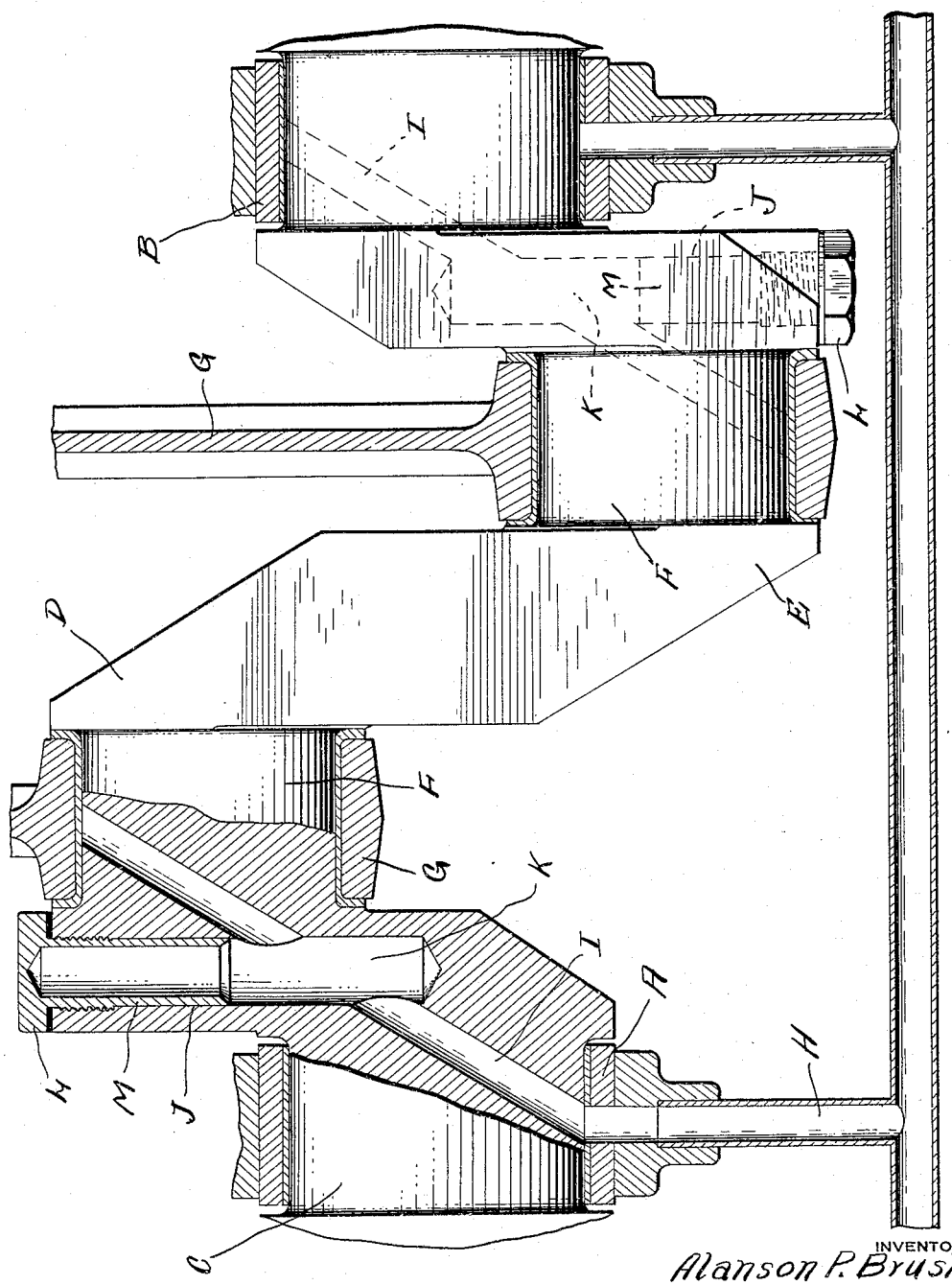
INVENTOR
Alanson P. Brush
BY
ATTORNEYS Patented July 26, 1932

1,868,814

UNITED STATES PATENT OFFICE

ALANSON P. BRUSH, OF DETROIT, MICHIGAN

PURIFIER FOR LUBRICATING SYSTEMS

Application filed June 24, 1929. Serial No. 373,465.

The invention relates to lubricating systems applied to engine crank shafts or other members revolving at relatively high speed. It is the object of the invention to eliminate impurities from the lubricant stream by centrifugal action and to this end the invention consists in the construction as hereinafter set forth.

The drawing illustrates a portion of an engine crank shaft partly in section showing my purifying means applied thereto.

As illustrated A and B are main bearings for an engine crank shaft C, and D and E are opposite throws of this crank shaft between said bearings, each being provided with a crank pin F for engaging a connecting rod G.

It is usual to lubricate both the main bearings and the crank pins of such engine shafts by boring the shaft to form a lubricant channel extending from the one bearing to the other. Thus the lubricant which is supplied under pressure to the main bearing through any suitable external conduit such as H may pass through the bore I to the crank pin F. The bore I extends obliquely and necessarily passes through the cheek of the crank throw.

Utilizing the construction as thus far described, and which is common in lubricating systems, I have devised a means for separating impurities from the lubricant during passage from one bearing to another. This is accomplished by boring the cheek J so as to intersect the oblique bore I and to form a radial chamber K eccentric to the axis of the crank shaft. In this chamber the lubricant is subjected to centrifugal action and any impurities carried in suspension and which are of a greater specific gravity than the oil will be forced radially outward lodging in the outer portion of the pocket. I also preferably provide for removal of such impurities by a detachable cap L closing the outer end of the bore K. This cap L may be provided with an inwardly extending sleeve portion M, so that the impurities which collect at the outer end of the chamber will be removed with the cap.

The construction as above described, is one which can be applied to any standard engine crank shaft with little additional cost as it is only necessary to form the radial bore in the crank cheek intersecting the oblique bore and to provide a removal cap therefor. The passage of lubricant through the inclined bore I is relatively slow and where the intersecting bore K is of larger cross section its travel through the latter is still further retarded. Thus the time interval in which the oil is subjected to centrifugal action in the chamber K will be sufficient to remove any impurities out of the path of the main stream.

What I claim as my invention is:

1. The combination with an engine crank shaft having a main bearing and a crank pin with a crank throw cheek therebetween, of a lubricant passage extending diagonally from said main bearing to said crank pin and through said cheek and a radially extending chamber in said cheek independent of but intersecting said oblique passage in which chamber suspended impurities in the lubricant are separated by centrifugal action.

2. The combination with an engine crank shaft having a main bearing and a crank pin with a crank throw cheek therebetween, of an oblique bore extending from said main bearing to said crank pin and through said cheek and a bore in said cheek intersecting said oblique portion eccentric to the axis of rotation and extending radially outward from the point of intersection to form a separating chamber in which suspended impurities are removed from the lubricant by centrifugal action.

3. The combination with an engine crank shaft having a main bearing and a crank pin with a crank throw cheek therebetween, of an oblique bore extending from said main bearing to said crank pin and through said cheek, a bore in said cheek intersecting said oblique portion eccentric to the axis of rotation and extending radially outward from the point of intersection to form a separating chamber in which suspended impurities are removed from the lubricant by centrifugal action, and a removable cap for closing the outer end of said radial bore.

In testimony whereof I affix my signature.

ALANSON P. BRUSH.